United States Patent
Popplewell et al.

(10) Patent No.: US 10,327,479 B2
(45) Date of Patent: Jun. 25, 2019

(54) SYSTEM AND METHOD FOR AN IMPROVED PERSONAL VAPOURIZATION DEVICE

(71) Applicant: CANOPY GROWTH CORPORATION, Smiths Falls (CA)

(72) Inventors: Peter Popplewell, Ottawa (CA); Andrew Stewart, Ottawa (CA); Steven Penney, Ottawa (CA)

(73) Assignee: CANOPY GROWTH CORPORATION, Smiths Falls, Ontario (CA)

(*) Notice: Subject to any disclaimer, the term of this patent is extended or adjusted under 35 U.S.C. 154(b) by 0 days.

(21) Appl. No.: 15/921,144

(22) Filed: Mar. 14, 2018

(65) Prior Publication Data

US 2018/0263283 A1    Sep. 20, 2018

Related U.S. Application Data

(60) Provisional application No. 62/471,751, filed on Mar. 15, 2017.

(51) Int. Cl.
  *A24F 47/00* (2006.01)
  *A24B 15/16* (2006.01)
  (Continued)

(52) U.S. Cl.
  CPC .......... *A24F 47/008* (2013.01); *A24B 15/167* (2016.11); *G05B 13/024* (2013.01); *H04B 1/3827* (2013.01)

(58) Field of Classification Search
  CPC .................................................. A24F 47/008
  See application file for complete search history.

(56) References Cited

U.S. PATENT DOCUMENTS

| 4,934,358 A | 6/1990 | Nilsson et al. |
| 4,947,875 A | 8/1990 | Brooks et al. |

(Continued)

FOREIGN PATENT DOCUMENTS

| CA | 2934983 | 12/2017 |
| CN | 104256895 | 1/2015 |

(Continued)

OTHER PUBLICATIONS

Arzu Ari, Jet, Ultrasonic, and Mesh Nebulizers: An Evaluation of Nebulizers for Better Clinical Outcomes. Eurasian Journal of Pulmonology 2014; 16: 1-7.

(Continued)

*Primary Examiner* — Eric Yaary
(74) *Attorney, Agent, or Firm* — Stinson LLP

(57) ABSTRACT

A vape device system including a payload reservoir that is identified by a payload identifier and that is configured to hold a substance for atomization. A processor is configured to determine an operational setting based on at least one of the payload identifier and a secondary data, which may include user information, prescription information, location information, payload information, historical vape device usage information, and historical payload reservoir information. A vape device system, and method of using the same, that includes a vape device and a computing device that includes the processor. A method of controlling a vape device including determining an operational setting of the vape device based on the payload identifier and/or secondary data. The operational settings may include a duty cycle setting, a temperature setting, an operational time duration, a dosage setting, and a security setting.

21 Claims, 4 Drawing Sheets

(51) Int. Cl.
*G05B 13/02* (2006.01)
*H04B 1/3827* (2015.01)

(56) References Cited

U.S. PATENT DOCUMENTS

| | | | |
|---|---|---|---|
| 5,284,133 A | 2/1994 | Burns et al. | |
| 6,772,756 B2 | 8/2004 | Shayan | |
| 6,814,083 B2 | 11/2004 | Likness et al. | |
| 7,088,914 B2 | 8/2006 | Whittle et al. | |
| 7,164,993 B2 | 1/2007 | Likness et al. | |
| 8,464,706 B2 | 6/2013 | Crockford et al. | |
| 8,550,069 B2 | 10/2013 | Alelov | |
| 8,602,037 B2 | 12/2013 | Inagaki | |
| 8,851,068 B2 | 10/2014 | Cohen et al. | |
| 8,897,628 B2 | 11/2014 | Conley et al. | |
| 8,899,239 B2 | 12/2014 | Hon | |
| 8,910,630 B2 | 12/2014 | Todd | |
| 9,220,294 B2 | 12/2015 | McCullough | |
| 9,320,301 B2 | 4/2016 | Memari et al. | |
| 9,380,813 B2 | 7/2016 | McCullough | |
| 9,462,832 B2 | 10/2016 | Lord | |
| 9,675,114 B2 | 6/2017 | Timmermans | |
| 9,723,871 B2 | 8/2017 | Xiang | |
| 9,814,263 B2 | 11/2017 | Cochand et al. | |
| 9,877,505 B2 | 1/2018 | Cameron et al. | |
| 9,883,697 B2 | 2/2018 | Memari et al. | |
| 9,888,725 B2 | 2/2018 | Cameron et al. | |
| 2013/0087144 A1 | 4/2013 | Todd | |
| 2013/0220315 A1* | 8/2013 | Conley | A24F 47/008 128/202.21 |
| 2013/0284192 A1 | 10/2013 | Peleg et al. | |
| 2013/0340775 A1 | 12/2013 | Juster et al. | |
| 2014/0096782 A1* | 4/2014 | Ampolini | A24F 47/008 131/328 |
| 2014/0107815 A1* | 4/2014 | LaMothe | A24F 15/18 700/90 |
| 2014/0116455 A1 | 5/2014 | Youn | |
| 2014/0278250 A1 | 9/2014 | Smith et al. | |
| 2014/0345633 A1 | 11/2014 | Talon et al. | |
| 2014/0345635 A1 | 11/2014 | Rabinowitz et al. | |
| 2015/0114407 A1* | 4/2015 | Duncan | A24F 47/004 131/329 |
| 2015/0122252 A1* | 5/2015 | Frija | A24F 47/008 128/202.21 |
| 2015/0136158 A1 | 5/2015 | Stevens et al. | |
| 2015/0142387 A1 | 5/2015 | Alarcon et al. | |
| 2015/0181945 A1 | 7/2015 | Tremblay | |
| 2015/0208731 A1 | 7/2015 | Malamud et al. | |
| 2015/0245660 A1 | 9/2015 | Lord | |
| 2015/0272220 A1 | 10/2015 | Spinka et al. | |
| 2015/0320116 A1* | 11/2015 | Bleloch | A61M 15/06 219/628 |
| 2015/0327596 A1 | 11/2015 | Alarcon et al. | |
| 2015/0332379 A1 | 11/2015 | Alarcon | |
| 2015/0366268 A1 | 12/2015 | Shabat | |
| 2016/0007651 A1 | 1/2016 | Ampolini et al. | |
| 2016/0039591 A1 | 2/2016 | Kinzer | |
| 2016/0089508 A1 | 3/2016 | Smith et al. | |
| 2016/0106936 A1* | 4/2016 | Kimmel | A24F 47/008 128/202.21 |
| 2016/0157524 A1 | 6/2016 | Bowen et al. | |
| 2016/0200463 A1 | 7/2016 | Hodges et al. | |
| 2016/0211693 A1 | 7/2016 | Stevens et al. | |
| 2016/0219932 A1 | 8/2016 | Glaser | |
| 2016/0219933 A1 | 8/2016 | Henry, Jr. et al. | |
| 2016/0219938 A1 | 8/2016 | Mamoun et al. | |
| 2016/0278435 A1 | 9/2016 | Choukroun et al. | |
| 2016/0309784 A1 | 10/2016 | Silvestrini et al. | |
| 2016/0331027 A1 | 11/2016 | Cameron | |
| 2016/0331036 A1 | 11/2016 | Cameron et al. | |
| 2016/0331913 A1 | 11/2016 | Bourque | |
| 2016/0337141 A1 | 11/2016 | Cameron | |
| 2016/0356751 A1 | 12/2016 | Blackley | |
| 2016/0363570 A1 | 12/2016 | Blackley | |
| 2016/0363917 A1 | 12/2016 | Blackley | |
| 2017/0013883 A1 | 1/2017 | Han et al. | |
| 2017/0019951 A1 | 1/2017 | Louveau et al. | |
| 2017/0020191 A1 | 1/2017 | Lamb et al. | |
| 2017/0093981 A1 | 3/2017 | Cameron | |
| 2017/0119981 A1 | 5/2017 | Davidson et al. | |
| 2017/0135411 A1 | 5/2017 | Cameron | |
| 2017/0136193 A1 | 5/2017 | Cameron | |
| 2017/0156399 A1 | 6/2017 | Freeman et al. | |
| 2017/0231280 A1 | 8/2017 | Anton | |
| 2017/0238610 A1 | 8/2017 | Reevell | |
| 2017/0258136 A1* | 9/2017 | Hawes | H04W 76/10 |
| 2017/0309091 A1 | 10/2017 | Cameron et al. | |
| 2017/0332702 A1 | 11/2017 | Cameron et al. | |
| 2017/0347707 A1 | 12/2017 | Xiang | |
| 2017/0347710 A1 | 12/2017 | Hon | |
| 2017/0368273 A1 | 12/2017 | Rubin | |
| 2018/0020729 A1 | 1/2018 | Alarcon et al. | |
| 2018/0043114 A1* | 2/2018 | Bowen | A61M 15/06 |
| 2018/0060873 A1* | 3/2018 | Chu | A24F 47/008 |
| 2018/0177231 A1* | 6/2018 | Woodbine | A24F 47/008 |

FOREIGN PATENT DOCUMENTS

| | | |
|---|---|---|
| EP | 2207528 | 10/2013 |
| EP | 3099363 | 12/2016 |
| EP | 3102266 | 12/2016 |
| EP | 3226704 | 10/2017 |
| GB | 2524779 | 10/2015 |
| GB | 2542008 | 3/2017 |
| GB | 2542009 | 3/2017 |
| GB | 2542270 | 3/2017 |
| GB | 2542501 | 3/2017 |
| GB | 2542926 | 4/2017 |
| GB | 2543906 | 5/2017 |
| WO | WO 2003097141 | 11/2003 |
| WO | WO 2015074308 | 5/2015 |
| WO | WO 2016050247 | 4/2016 |
| WO | WO 2016064906 | 4/2016 |
| WO | WO 2016172802 | 11/2016 |
| WO | WO 2016187695 | 12/2016 |
| WO | WO 2017055800 | 4/2017 |
| WO | WO 2017083541 | 5/2017 |
| WO | WO 2017178958 | 10/2017 |
| WO | WO 2017203515 | 11/2017 |
| WO | WO 2018029077 | 2/2018 |

OTHER PUBLICATIONS

International Search Report and Written Opinion for related application PCT/CA2018/050310, dated May 8, 2018 (10 pgs).

* cited by examiner

SYSTEM AND METHOD FOR AN IMPROVED PERSONAL VAPOURIZATION DEVICE

CROSS-REFERENCE TO RELATED APPLICATIONS

This application is based on and claims priority to U.S. Provisional Application Ser. No. 62/471,751, filed on Mar. 15, 2017 and titled Personal Vapourizer Device, which is incorporated herein by reference in its entirety.

STATEMENT REGARDING FEDERALLY SPONSORED RESEARCH OR DEVELOPMENT

Not applicable.

STATEMENT REGARDING JOINT RESEARCH AGREEMENT

Not applicable.

BACKGROUND OF THE INVENTION

1. Field of the Invention

The present disclosure is related to the field of personal vapourizer devices or "vape devices", and in particular, methods and systems for controlling the operation of vape devices.

2. Description of Related Art

The use of personal vapourizers or vape devices for consuming tobacco products, as well as cannabis for medical and recreational purposes, has grown significantly. Many of the vape devices merely contain an atomizer for heating and vapourizing liquids or oils to be inhaled. In a basic form, vape devices can be simple devices consisting of a heating element, a battery and a switch for connecting the battery to the heating element, and an amount of liquid or oil to be vapourized by the heating element. Controlling the vape device merely entails closing the switch to heat the liquid or oil to produce vapour to be inhaled. Such simplicity provides no control as to the ramping up and/or down of power applied to the heating element; no control as to the metering of how much vapour is produced when the switch is closed; no control as to how particular fluids or oils are to be heated to produce vapour; or no control to prevent unauthorized use of the vape device by anyone other than the user of the vape device.

BRIEF SUMMARY OF THE INVENTION

In some embodiments, a high-quality, best-in-class rechargeable vape device is provided. This product is simple and intuitive and appeals instantly to the "cannabis-naive" customer, whether medical or recreational. In some embodiments, the vape device can communicate with a personal computing device and work interactively with an application or "app" operating on the personal computing device to provide additional functions and features that can meet the demands and needs of the most sophisticated connoisseur or medical patient. For the purposes of this description and the claims that follow, the term "personal computing device" is defined as including personal computers, laptop computers, personal digital assistants, personal computing tablets (such as those made by Apple® and Samsung®, and by others as well known to those skilled in the art), smart phones (such as those running on iOS® and Android® operating systems, and others as well known to those skilled in the art), smart watches, fitness tracking wristbands, wearable devices, smart glasses, and any other electronic computing device that comprises means for communications (wireless or wired) with other electronic devices, and with a global telecommunications or computing network.

In some embodiments, the vape device can comprise security settings to prevent unauthorized use of the vape device by anyone other than the owner of the vape device, who has a prescription for medical marijuana. In some embodiments, the security settings can prevent the use of the vape device in regions or jurisdictions, even by the rightful owner of the vape device, where the consumption of medical marijuana is not authorized or legal. These security settings can be implemented to appease government or law enforcement for unauthorized use of the vape device in the consumption of cannabis products, for medical purposes or otherwise.

In some embodiments, the vape device can comprise a disposable or single-use version with reduced functionality but adapted from higher quality embodiments thereof.

In some embodiments, the vape device can comprise a traditional "cigarette appearance" while other embodiments can comprise a non-cigarette appearance.

In some embodiments, the vape device can comprise a light to emulate the ember of a cigarette when vapour is being inhaled.

In some embodiments, the vape device, in combination with an app running on a personal computing device, can control the temperature and/or duty cycle of vapourization to optimize for flavor or vapour quantity for any given type of fluid or oil to be vapourized for inhalation. In some embodiments, the app can be used to improve the efficiency of the operation of the vape device and to maximize the longevity of a fluid or oil-filled cartridge or payload reservoir used in the vape device.

In some embodiments, the app can include features to customize a user's vape device, such as naming the vape device, selecting its color and controlling a vibrating device disposed in the vape device. In some embodiments, the app can include security settings to control access to the vape device, and to lock it when not in use.

In some embodiments, the vape device can comprise a processor operating on firmware disposed thereon. Connectivity between the vape device and the app disposed on the personal computing device can enable means for updating the firmware on the vape device to keep it operating on the most current firmware. In some embodiments, the vape device can comprise a physical configuration that can be adapted to display an OEM brand or sub-brand depending on the brand, the sales channel for the branded vape device, and the vape device's anticipated end use such as medical, recreational, etc.

In some embodiments, the vape device will be used with high quality oil products that cannot leak from the vape device. The vape device will avoid producing stale smoke by high temperature heating, quick cooling and providing a fast path for vapour to be inhaled from the vape device.

In some embodiments, the vape device can comprise a battery as a power source for vapourizing oils and liquids. The battery can comprise a lithium ion power cell although other battery technologies can be used, as well known to those skilled in the art. As the vape device is a personal use device, the battery can comprise technology that prevents the advent of an explosion should the battery fail.

In some embodiments, the vape device can be configured not to contain or use propylene glycol ("PG") or other non-essential chemicals anywhere, whether in the oils used in the vape device or on materials used in the manufacture thereof.

In some embodiments, the vape device can comprise means for preventing it from overheating.

In some embodiments, the vape device can comprise means for preventing it from producing latent odors or smells. The vape device can further be configured to produce vapour that can be seen when it is exhaled by a user.

In some embodiments, the vape device can be configured to enable viewing of oils or fluids in a cartridge or payload reservoir when it is inserted into the vape device. In other embodiments, the vape device can be configured so that the oil or fluid in the cartridge is not visible when the cartridge is inserted into the vape device.

In some embodiments, the vape device can be configured to be water-resistant or water-proof.

In some embodiments, cartridges for use with the vape device can be separated from the vape device, and can be available in various sizes in terms of the amount of liquid or oil it can contain.

In some embodiments, each cartridge or payload reservoir can comprise a unique serial number or payload identifier, and the vape device can further comprise means for determining whether the vape device can work with the cartridge or not depending on the specific serial number of the cartridge.

In some embodiments, the vape device can comprise means for acquiring data on a cartridge based on the serial number of the cartridge that can be used to control the operation of the vape device. For example, the vape device can acquire certain data specific to the fluid or oil in the cartridge to know the manufacturer-recommended temperature and/or duty cycle for heating the fluid or oil in order to achieve optimum vapourization. In some embodiments, the vape device can comprise means for enabling the user to alter one or more operational settings of the vape device to suit the user's personal preferences. In some embodiments, the vape device can comprise means for tracking of data relating to the operation of the vape device and its use by a user. In some embodiments, the vape device can be configured to provide warnings in the advent of certain conditions of the vape device, such as when, the cartridge is almost empty, when the battery is nearly depleted, when the heating element is overheating or non-functioning to name but a few. In some embodiments, the vape device can comprise means for monitoring and collecting data on how the vape device is being used by a user, and to provide information and assessments about the way the user uses the vape device in addition to being able to provide advice to the user on how to improve or optimize their use of the vape device based on the user's current use of the vape device.

In some embodiments, the vape device can be configured for exchanging data with other personal computing devices that a user may use or possess, such as a smart phone or device (like an iPhone® or Apple® Watch®) or a fitness tracking wristband (like a Fitbit®) to provide the user with further information on their life and habits.

In some embodiments, the vape device can comprise means for locating it should it become lost. This can include means for communicating with a smart phone or device to provide similar functionality as the Find iPhone™ app as used on Apple® iPhones® and iPads®.

In some embodiments, the vape device can be configured for communicating with an app running on a smart phone or personal computing device, wherein the app can comprise the ability to adjust the temperature and/or duty cycle the heating element operates at, as well as being able to control the operation of the vape device for users of various experience. As an example, the app can enable an anti-cough setting on the vape device for a novice user.

A personal vapourizer device or "vape device" that can communicate with smart phones or devices and operate in conjunction with applications running thereon to control and monitor the use of the vape device by a user.

In some embodiments, the app can be configured to acquire specific information on the liquid or oil being vapourized based on the serial number of the cartridge. This information can then be used to be control or meter the dose of vapour inhaled by the user. The app can further track when the cartridge is running out of liquid or oil, and can further be configured to prompt the user to replace or order a new cartridge, as well as being able to order a new cartridge automatically.

In some embodiments, the vape device can be locked and unlocked by the user with their personal computing device. In some embodiments, the vape pen can be unlocked by the user by opening their personal computing device by satisfying the device's security settings, that is, by the user entering their security access code or password into the personal computing device, or by using a fingerprint scanner disposed on the personal computing device, or by using a camera disposed on the device for facial or retinal scans of the user. In some embodiments, the vape device can be configured to be child-resistant, as well as prevent use by an unauthorized user. In some embodiments, the vape device can be configured to lock inherently when not connected to the app for regulatory purposes. In some embodiments, the vape device can further comprise means for identifying an authorized user when connectivity with the user's smart phone or device is lost, such as when the user does not have their smart phone or device, or when the battery in the smart phone or device becomes depleted. Such means can include a fingerprint sensor disposed on the vape device itself, wherein the vape device can retain personal data on the user such as one or more fingerprint scan data stored in a memory on the vape device in order to determine whether a fingerprint scan taken by the fingerprint sensor matches the fingerprint scan data stored in the memory to confirm the identity of the person attempting to use the vape device is an authorized user.

Broadly stated, in some embodiments, an improved vape device can be provided, comprising: an atomizer comprising a heating coil, the atomizer further comprising an inlet and an outlet; a mouthpiece operatively coupled to the outlet; and a payload reservoir operatively coupled to the inlet, the payload reservoir comprising an identifier ("ID") tag comprising a unique identifier for the payload reservoir, the payload reservoir configured to hold liquid or oil that can be drawn into the atomizer to be vapourized when the user draws on the mouthpiece.

Broadly stated, in some embodiments, the vape device can further comprise a radio frequency transceiver or wireless transceiver and at least one antenna operatively coupled to the transceiver, the combination of the transceiver and the antenna configured for enabling the wireless transmission of data between the vape device and a personal computing device.

Broadly stated, in some embodiments, an improved vape device system can be provided, the system comprising a vape device comprising: an atomizer comprising a heating coil, the atomizer further comprising an inlet and an outlet, a mouthpiece operatively coupled to the outlet, a payload reservoir operatively coupled to the inlet, the payload reservoir comprising an identifier ("ID") tag comprising a unique identifier for the payload reservoir, the payload reservoir configured to hold liquid or oil that can be drawn into the atomizer to be vapourized when the user draws on the mouthpiece, and a radio frequency transceiver and at least one antenna operatively coupled to the transceiver, the combination of the transceiver and the at least one antenna configured for wirelessly transmitting and receiving data; and a personal computing device configured for the wireless transmission of the data to and from the vape device.

Broadly stated, in some embodiments, the vape device can further comprise a switch or a draw sensor operatively coupled to the mouthpiece, the switch or the draw sensor configured to cause electrical current to flow through the heating coil when the switch is operated or when the user draws on the mouthpiece.

Broadly stated, in some embodiments, the vape device can further comprise a battery configured to provide the electrical current.

Broadly stated, in some embodiments, the vape device can further comprise a battery charger configured for charging the battery.

Broadly stated, in some embodiments, the personal computing device can comprise a software application running thereon, wherein the combination of the vape device and the personal computing device can be configured for wireless control of the vape device using the personal computing device.

Broadly stated, in some embodiments, the software application can be further configured for carrying out the steps of: interpreting the ID tag via first data transmitted to the personal computing device from the vape device, the first data comprising the unique payload identifier; using the unique identifier to determine what liquid or oil is in the payload reservoir; and transmitting an operational setting to the vape device from the personal computing device, the operational setting comprising instructions to the vape device to either enable operation of the vape device if the user is authorized to use the vape device or to disable operation of the vape device if the user is not authorized to use the vape device.

Broadly stated, in some embodiments, the operational setting can further comprise instructions to the vape device to either enable operation of the vape device if the user is located in a geographic region where the liquid or oil can be vapourized by the user and to disable operation of the vape device if the user is located in a geographic region where the liquid or oil cannot be vapourized by the user.

Broadly stated, in some embodiments, the vape device can further comprise a microcontroller operatively coupled to the atomizer and to the ID tag, the microcontroller configured to control the operation of the vape device.

Broadly stated, in some embodiments, the vape device can further comprise a user interface operatively coupled to the microcontroller.

Broadly stated, in some embodiments, the user interface can comprise one or more user input control devices operatively coupled to the microcontroller, the input control devices configured for controlling the operation of the vape device when operated by the user.

Broadly stated, in some embodiments, the user interface can further comprise one or more user output indicating devices operatively coupled to the microcontroller, the output indicating devices configured for relaying information on the operation of the vape device to the user.

Broadly stated, in some embodiments, the atomizer can be disposed in an atomizer subassembly; the mouthpiece and the payload reservoir can be both disposed in a mouthpiece subassembly; and the microcontroller can be disposed in a control subassembly, wherein the atomizer subassembly can be disposed between the mouthpiece subassembly and the control subassembly.

In one preferred embodiment, a vape device system includes an atomizer having an inlet and an outlet, a mouthpiece coupled to the outlet, an activation mechanism coupled to the atomizer, a payload reservoir coupled to the inlet, and a processor. The payload reservoir is identified by a payload identifier, and the payload reservoir is configured to hold a substance for vapourization. The processor is configured to determine an operational setting based on at least one of the payload identifier and a secondary data.

The processor may be physically coupled directly or indirectly to at least one of the atomizer, the mouthpiece, the activation mechanism, and the payload reservoir. Alternatively, the system may include (i) a vape device comprising the atomizer, the mouthpiece, the activation mechanism, the payload reservoir, a second processor, and a wireless transceiver, and (ii) a computing device comprising the processor. The second processor is preferably configured to receive the payload identifier and transmit the payload identifier to the wireless transceiver. The wireless transceiver is preferably configured to transmit the payload identifier to the processor, and the wireless transceiver is preferably further configured to receive the operational setting from the processor and transmit the operational setting to the second processor.

The secondary data is preferably selected from a group consisting of user information, prescription information, location information, and payload information. The operational setting preferably includes at least one of a duty cycle setting, a temperature setting, an operational time duration, a dosage setting, and a security setting.

A method of controlling a vape device comprising a payload reservoir that is identified by a payload identifier includes steps of transmitting the payload identifier to a processor, determining an operational setting of the vape device with the processor based on the payload identifier and a secondary data, and controlling the vape device based on the operational setting.

The processor may be located in a computing device remotely from the vape device, wherein the vape device comprises a second processor that receives the payload identifier and transmits the payload identifier to a wireless transceiver of the vape device. The wireless transceiver preferably transmits the payload identifier to the processor, and the wireless transceiver preferably receives the operational setting from the processor and transmits the operational setting to the second processor.

The secondary data may be historical vape device usage information or historical payload reservoir information, and the operational setting includes at least one of a duty cycle setting, a temperature setting, an operational time duration, and a dosage setting. The secondary data may be prescription information, and the operational setting includes at least one of a duty cycle setting, a temperature setting, an operational time duration, and a dosage setting.

The secondary data may be location information, and the operational setting is a security setting of the vape device. The secondary data may be user information, and the operational setting is a security setting of the vape device. The secondary data may be user information, and the operational setting includes at least one of a duty cycle setting, a temperature setting, an operational time duration, and a dosage setting.

A method of determining an operational setting of a vape device comprising a payload reservoir that is identified by a payload identifier includes steps of authenticating a user via a software application on a computing device, transmitting the payload identifier from a wireless transceiver of the vape device to the computing device, determining the operational setting with the computing device based at least in part on the payload identifier or a secondary data, transmitting the operational setting from the computing device to the vape device, and controlling the vape device based on the operational setting. The secondary data and operational settings may be any of those described above. The method may comprise unlocking or locking the vape device based on a detected motion, acceleration, altitude, or velocity of the vape device or the computing device.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, acts, etc. described in one embodiment may also be included in other embodiments, but is not necessarily included. Thus, the present technology can include a variety of combinations and/or integrations of the embodiments described herein.

Figure 1:
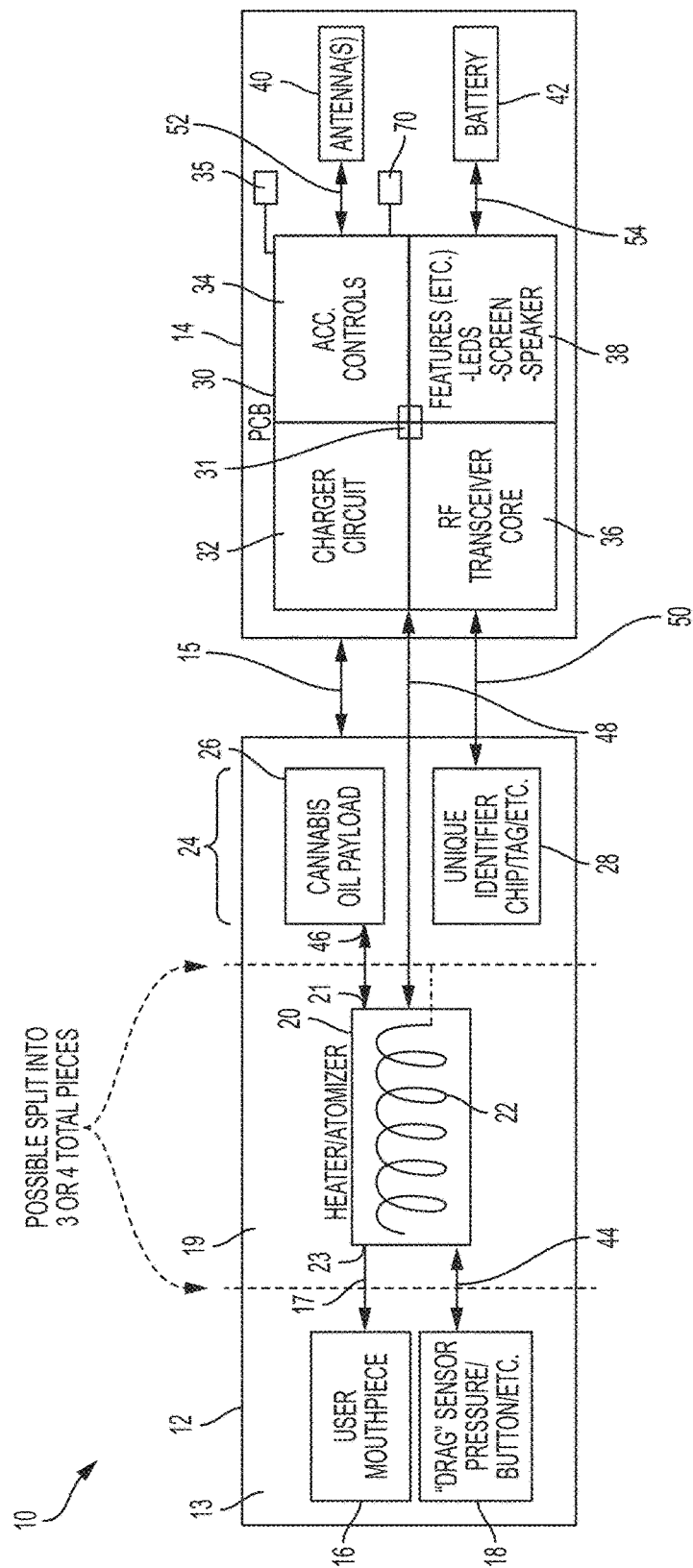
FIG. 1 is a block diagram depicting one embodiment of an improved vape device.

Referring to FIG. 1, one embodiment of vape device 10 is shown. Vape device 10 includes a mouthpiece assembly 12, an atomizer subassembly 19, a payload section 24, and a control subassembly 14. Any of mouthpiece assembly 12, atomizer subassembly 19, payload section 24, and control subassembly 14 may be formed integrally together and included within a common housing suitable for grasping by a user. Further, any of mouthpiece assembly 12, atomizer subassembly 19, payload section 24, and control subassembly 14 may be formed in separate housings that are releasably connected to each other via connecting means 15, which can comprise, for example, one or more of pressure or friction fit connection means, twist mechanical lock means, magnetic connection means and any other connecting means as well known to those skilled in the art. By way of example, mouthpiece assembly 12 may be releasably connected to atomizer subassembly 19, payload section 24 and control subassembly 14, which are either formed integrally together or in separate housings that are releasably connected to each other. Mouthpiece assembly 12 and atomizer subassembly 19 may be formed integrally together and releasably connected to payload section 24 and control subassembly 14, which are either formed integrally together or in separate housings that are releasably connected to each other. Further, mouthpiece assembly 12, atomizer subassembly 19, and payload section 24 may be formed integrally together and releasably connected to control subassembly 14.

In some embodiments, mouthpiece assembly 12 is operatively coupled to control subassembly 14 via connecting means 15. In some embodiments, a heater or atomizer 20 is disposed in atomizer section 19, with atomizer 20 further comprising a heating coil 22 disposed therein for heating and vapourizing liquids or oils. Atomizer 20 can comprise an inlet 21 and an outlet 23, wherein inlet 21 can be in communication, via fluid connector 46, with payload reservoir 26 disposed in payload section 24, wherein payload reservoir 26 can contain liquid or oil for vapourization or atomization. Outlet 23 can be in communication with a user mouthpiece 16 of mouthpiece assembly 12 via a conduit 17.

In some embodiments, payload section 24 can comprise an identifier ("ID") tag 28, which can further comprise a unique payload identifier that identifies payload reservoir 26, and also optionally, secondary data as described below. The unique payload identifier of ID tag 28 may be a serial number or tracking number for reservoir 26 as a means to identify what liquid or oil is contained in reservoir 26 so as to obtain information as to the specific parameters of operation of atomizer 20, or operational settings, that are optimal for vapourizing the specific liquid or oil contained in reservoir 26. For example, the payload identifier may be compared to a database that includes the payload identifiers from a plurality of payload reservoirs. The database may include specific operational settings and secondary data for each of the payload identifiers, as described below.

ID tag 28 may be any type of device that includes memory or storage capable of storing payload identifier and, optionally, secondary data, and means for allowing that payload identifier and/or secondary data to be retrieved by another device, such as microcontroller 31 and/or RF transceiver circuit 36, for processing and/or further transmission. For example, ID tag may be an RFID tag or non-volatile memory.

For the purposes of this specification, the term "electrical connection" shall include any form of electrical connection via a wired or wireless connection, such as electrical conductors or wires suitable for the transmission of alternating or direct current power, analogue or digital electrical signals or radio frequency signals, as the case may be and as well-known to those skilled in the art.

In some embodiments, mouthpiece assembly 12 can comprise a draw switch 18 operatively coupled to atomizer 20 via an electrical connection 44, wherein draw switch 18 can cause electric current from battery 42 to flow through heating coil 22. In some embodiments, draw switch 18 can comprise a draw sensor, such as a mass air flow sensor, that can produce an electrical signal in response to when a user inhales or draws on mouthpiece 16, wherein the electrical signal can cause electric current from battery 42 to flow through heating coil 22. In some embodiments, draw switch 18 can be used as a simple "switch" as a means to turn on atomizer 20 to vapourize liquid or oil drawn into atomizer 20 from reservoir 26 as the user draws on mouthpiece 16. In some embodiments, draw switch 18 can be configured to monitor how much liquid or oil is being vapourized or how much volume of vapour is being inhaled by the user. Draw switch 18 is one type of activation mechanism that may be used to activate atomizer 20. Draw switch 18 may be replaced with or used in connection with another type of activation mechanism that receives an input to switch it from an off position, in which atomizer 20 is not activated, and a on position, in which atomizer 20 is activated. For example, draw switch 18 may be replaced with or used in connection with any of the following types of activation mechanisms: a button, switch, draw sensor, pressure transducer, proximity sensor, touch sensor, voice recognition sensor, haptic control, saliva and breath biosensor, and the like.

In some embodiments, mouthpiece 16 and draw switch 18 can be part of a single-piece mouthpiece subassembly 12, or can be disposed in a separate mouthpiece section 13 that forms part of mouthpiece subassembly 12.

In some embodiments, atomizer 20 can be disposed in atomizer subassembly 19 that can either be integral to mouthpiece subassembly 12, or a physically separate enclosure that can couple to mouthpiece subassembly 12. Instead of or in addition to including a heating coil 22 as disclosed herein, atomizer 20 may include any other structure capable of vapourizing a liquid or oil in a suitable form for inhalation. For example, atomizer 20 may include a jet nebulizer, an ultrasonic nebulizer, or a mesh nebulizer.

In some embodiments, payload reservoir 26 and ID tag 28 can be disposed in payload section 24 that can either be integral to mouthpiece subassembly 12 and/or atomizer subassembly 19, or a physically separate enclosure that can couple to mouthpiece subassembly 12 and/or atomizer subassembly 19, which can include one or more of connecting means 15 described above. Preferably, ID tag 28 is physically coupled to payload reservoir 26 either directly or indirectly (e.g., ID tag 28 and payload reservoir 26 are included in a common housing of payload section 24) in a tamper resistant manner.

In some embodiments, control subassembly 14 can comprise one or more antenna 40, a battery 42 and a circuit board 30 that can further comprise a microcontroller 31 configured for carrying out one or more electronic functions in respect of the operation of vape device 10. Having more than one antenna 40 can enable the ability for diversity wireless communications of RF signals, as well known to those skilled in the art. In some embodiments, circuit board 30 can comprise a charger circuit 32 configured for charging battery 42. Charger circuit 32 can be integral to circuit board 30 or can be disposed on a separate circuit board operatively connected to circuit board 30 and to battery 42 via electrical connection 54. Charger circuit 32 can be configured to be operatively connected to an external source of power, either via a shared or dedicated electrical connector 35 operatively coupled to circuit board 30 with internal connection to charger circuit 32, or a wireless connection for power transfer, as well known to those skilled in the art.

In some embodiments, circuit board 30 can comprise user input interface circuit 34 and output interface circuit 38. Either or both of input interface circuit 34 and output interface circuit 38 can be integral to circuit board 30 or can be disposed on a separate circuit board operatively connected to circuit board 30. In some embodiments, input interface circuit 34 can provide the electrical interface between user controls and activation mechanisms disposed on vape device 10, such as buttons, switches, draw sensors, pressure transducers, proximity sensors, touch sensors, voice recognition sensors, haptic controls, saliva and breath biosensors, and the like, and microcontroller 31 and, thus, can provide the means to relay user input commands from the user controls as instructions to microcontroller 31 to operate vape device 10. For example, input interface circuit 34 may be electrically coupled to draw switch 18 for receiving an on signal from draw switch 18 when a user draws on mouthpiece 16. When input interface circuit 34 receives the on signal from draw switch 18, it may send instructions to microcontroller 31 to activate atomizer 20. In some embodiments, output interface circuit 38 can provided the electrical interface between microcontroller 31 and output display devices, such as indicator lights, alphanumeric display screens, audio speakers, surface heaters, vibration devices, and any other forms of tactile feedback devices as well known to those skilled in the art, and, thus, can provide the means to relay information relating to the operation of vape device 10 from microcontroller 31 to the user.

Figure 3:
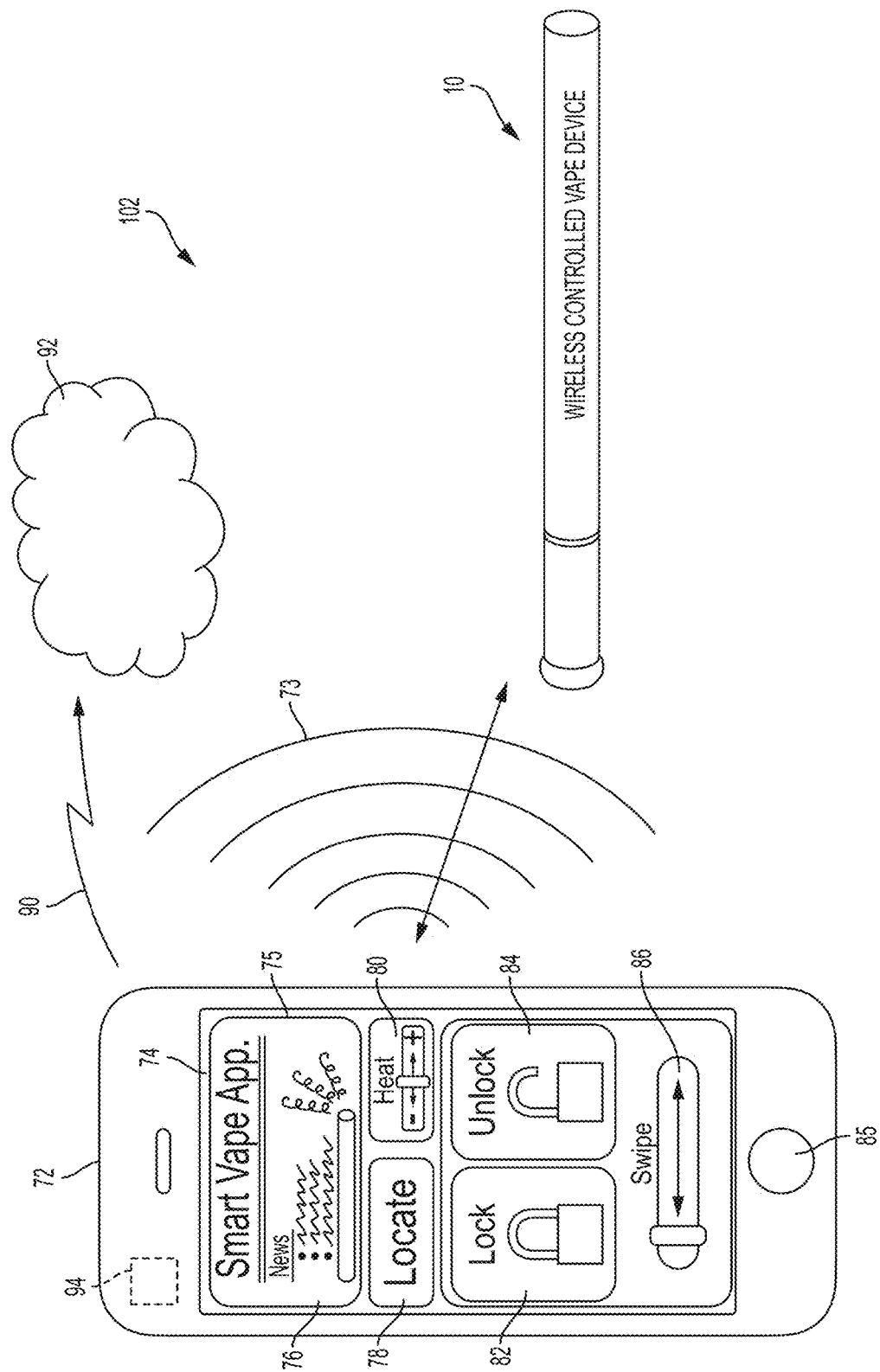
FIG. 3 is a block diagram depicting a vape device system comprising an improved vape device capable of wireless communication with a computing device.

In some embodiments, circuit board 30 can comprise radio frequency ("RF") transceiver circuit 36 to provide the means for wireless communication of data between vape device 10 and a personal computing device, such as computing device 72 as shown in FIG. 3. In some embodiments, RF transceiver circuit 36 can be integral to circuit board 30 or can be disposed on a separate circuit board operatively connected to circuit board 30. RF transceiver circuit 36 can be connected to one or more antennas 40 via electrical connection 52, as well known to those skilled in the art. RF transceiver circuit 36 and the one or more antennas 40 comprise a wireless transceiver of vape device 10.

In some embodiments, microcontroller 31 can comprise a microprocessor (which for purposes of this disclosure also incorporates any type of processor) having a central processing unit as well known to those skilled in the art, wherein the microprocessor can further comprise a memory configured for storing a series of instructions for operating the microprocessor in addition for storing data collected from sensors disposed on vape device 10 or data received by vape device 10 to control its operation, such as operational settings. Microcontroller 31 is in electrical communication with charger circuit 32, user input interface circuit 34, output interface circuit 38, and RF transceiver circuit 36 for receiving instructions and/or data from and/or transmitting instructions and/or data to charger circuit 32, user input interface circuit 34, output interface circuit 38, and RF transceiver circuit 36. In some embodiments, atomizer 20 can be operatively and electrically connected to circuit board 30 via electrical connection 48, which can provide the means to activate atomizer 20 when an activation mechanism such as draw switch 18 sends an on signal to microcontroller 31 (e.g., deliver electrical current from battery 42 to heating coil 22), as well as receiving data signals from draw switch 18 and/or atomizer 20. In this manner, the activation mechanism (i.e., draw switch 18) is coupled to the atomizer 20 indirectly through microcontroller 31, and a direct connection between the activation mechanism and atomizer 20 is not required (i.e., activation mechanism sends a signal to microcontroller 31 that sends a signal to activate atomizer 20). In addition to controlling operation of atomizer 20 based on a signal received from the activation mechanism, microcontroller 31 also controls operation of atomizer 20 based on the operational settings as described herein. In some embodiments, microcontroller 31 can be operatively connected to ID tag 28 via electrical connection 50, which may be either a wired or wireless connection.

The operational settings referred to herein include any type of setting or instruction that instructs the vape device 10 or certain components of the vape device 10 to operate or not operate in a particular manner. Specifically, operational settings of the vape device 10 include a duty cycle setting, a temperature setting, an operational time duration, a dosage setting, and a security setting. The duty cycle setting preferably corresponds to a pulse width modulation instruction transmitted from microcontroller 31 to battery 42 and heating coil 22 to send electrical current to heating coil 22 in a particular desired manner. The temperature setting preferably corresponds to a temperature instruction transmitted from microcontroller 31 to battery 42 and heating coil 22 to send electrical current to heating coil 22 to maintain heating coil 22 at a desired temperature or range of temperatures. A temperature sensor may be coupled to microcontroller 31 to measure the actual temperature of heating coil 22 and transmit that information to microcontroller 31 for determination on the amount and duration of electrical current that needs to be sent to heating coil 22 to maintain a particular temperature or range of temperatures. The operational time duration preferably corresponds to a time instruction transmitted from microcontroller 31 to battery 42 and heating coil 22 to maintain heating coil 22 at a temperature suitable for vapourization of the contents of payload reservoir 26 for a desired time. The dosage setting preferably corresponds to a dosage instruction transmitted from microcontroller 31 to battery 42 and heating coil 22 that powers down heating coil 22 when a desired volume of vapour passes through atomizer 20. A vapour metering device may measure the volume of vapour passing through atomizer 20 and transmit that information to microcontroller 31, which compare the actual volume passed through atomizer 20 to the dosage setting to determine when to shut off heating coil 22. The security setting preferably corresponds to a security instruction that causes microcontroller 31 to prevent operation of atomizer 20 when an event has or has not occurred. Security settings described herein that would prevent operation of atomizer 20 include a payload reservoir 26 that is tampered with or stolen, an unauthorized user (e.g., user does not have a valid prescription for the substance within payload reservoir 26, or user is not identified as owning or having valid rights to use the payload reservoir 26), a user that is in a location that does not permit use of vape device 10, a user that is traveling in a vehicle, a user that has exceeded his/her permitted usage of the substance in payload reservoir 26 within a particular time frame, and any other security setting described herein or reason why vape device 10 is rendered inoperable as described herein In some embodiments, ID tag 28 can be used to identify the person who has a prescription for vapourizing the liquid or oil stored in payload reservoir 26 (e.g., ID tag 28 includes a payload identifier that is associated in a database with user information and prescription information for a particular individual having a prescription for the contents within payload reservoir 26). This information (i.e., payload identifier and prescription information associated with the payload identifier) can be used as a security measure to determine if a user of vape device 10 is the person who owns vape device 10 and has a valid prescription to consume the liquid or oil contained in vape device 10. ID tag 28 and/or microcontroller 31, along with appropriate sensors, can also be used as part of a system for gathering data relating to the use of vape device 10 by the user by monitoring that can include, without limitation, historical vape device usage information, such as how many times vape device 10 is used during a given period of time (hour, day, week, etc.), the duration of each use of vape device 10, how many draws the user takes on vape device 10, the amount of liquid or oil consumed during each use of vape device 10 among others. In some embodiments, the information regarding how much liquid or oil is consumed by the user can be used as clinical data for determining whether the user is consuming the right amount of medicine to be vapourized and inhaled and at the right times of day. The information can be used to provide feedback to the user in terms of whether the user should consume medicine more frequently or less frequently throughout the day and/or to increase or decrease the amount of medicine consumed per usage overall or per usage at particular times of the day. In some embodiments, the information collected about the user's consumption of cannabis liquid or oil consumption with vape device 10 can be used to estimate the user's intoxication or impairment based on the user's physical characteristics and the amount of cannabis liquid or oil consumed. This estimation can be relayed to the user as a means to inform the user as to whether the user is too intoxicated or impaired to operate a motor vehicle or to operate tools or machinery, as an example.

In some embodiments, the vape device 10 and/or computing device 72 can monitor when payload reservoir 26 is nearly empty of liquid or oil and alert the user to that fact. In some embodiments, the system can automatically order a replacement payload reservoir 26 by computing device 72 connecting to global telecommunications network 92 via wireless communications link 90, as shown in FIG. 3, if the user has configured the system to perform that function. In some embodiments, this information and data can be transmitted as first data to be used as inputs to a software application 74 running on the user's personal computing device 72 or via cloud computing from a manufacturer or supplier of vape device 10, wherein the application is configured to control the operation of vape device 10.

In some embodiments, the application 74 can use the payload identifier in ID tag 28 to determine what liquid or oil is currently disposed within vape device 10 and then use the unique payload identifier in ID tag 28 to determine the operational settings of vape device 10 for vapourizing the specific liquid or oil disposed in vape device 10 as per the recommended settings from the manufacturer of the liquid or oil and/or of vape device 10. The application 74 can access those operational settings via a connection to an online source of data, or can access a table of data that is included with, or is otherwise incorporated into, the application 74 (e.g., stored in memory on computing device 72) to locate the operational settings. In some embodiments, the application 74 can access the online source of data or operational settings to update the table of data stored locally on computing device 72, which can be done periodically and automatically, or manually by the user prompting the application 74 to update the data, or a combination of both processes. The located operational setting(s) can then be transmitted as operational setting(s) to vape device 10 from the user's personal computing device 72.

Figure 2:
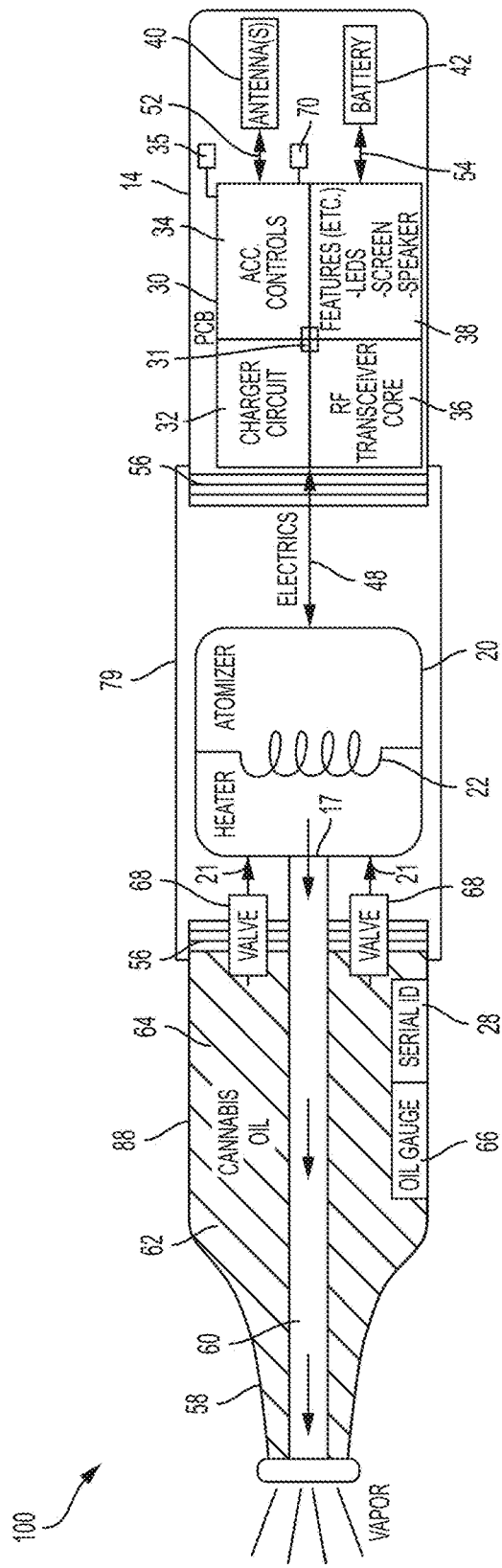
FIG. 2 is a block diagram depicting another embodiment of an improved vape device.

Referring to FIG. 2, another embodiment of vape device 100 is shown. In some embodiments, vape device 100 can comprise control subassembly 14, atomizer subassembly 79 and mouthpiece subassembly 88 operatively coupled together in that order using mechanical connection means 56 to join the subassemblies together. Mechanical connection means 56 can comprise one or more of threaded connection means, magnetic connection means and friction or press-fit connection means, and any of the connection means 15 described above. In some embodiments, mouthpiece subassembly 88 can comprise a mouthpiece 58 in communication with outlet 17 of atomizer 20 via conduit 60. Mouthpiece subassembly 88 can further comprise a payload reservoir 62 that can be filled with liquid or oil 64. Liquid or oil 64 can flow from payload reservoir 62 to inlet 21 of atomizer 20 via one or more valves 68. In some embodiments, mouthpiece subassembly 88 can comprise ID tag 28 and an oil gauge 66, which can be configured to monitor the volume of liquid or oil 64 in payload reservoir 62 and relay that information to microcontroller 31. In this embodiment, mouthpiece subassembly 88 can be a consumable element that can be replaced as a complete subassembly once depleted, or simply interchanged with another mouthpiece subassembly 88 containing a different liquid or oil 64 for consumption, depending on the needs and wants of the user. In some embodiments, oil gauge 66 can simply be a sight glass disposed on mouthpiece subassembly 88 to provide a visual indicator to the user as to the amount of liquid or oil remaining therein.

In some embodiments, atomizer subassembly 79 can also be a replaceable subcomponent of vape device 100 if and when atomizer 20 becomes damaged or simply ceases to work any further. In some embodiments, control subassembly 14 can comprise sensors 70 electrically coupled to input interface circuit 34 along with user input buttons and controls (not shown) disposed on vape device 10 in addition to draw switch 18, as described above and shown in FIG. 1.

Control subassembly 14 of vape device 100 is preferably substantially similar to control subassembly 14 of vape device 10. Atomizer 20 of vape device 100 is preferably substantially similar to atomizer 20 of vape device 10, and may include alternative means for vapourizing liquid or oils other than a heater as described above in connection with vape device 10. It is within the scope of the invention for atomizer subassembly 79 and mouthpiece subassembly 88 to be formed integrally within a common housing that is releasably connected to control subassembly 14. Further, it is within the scope of the invention for control subassembly 14 and atomizer subassembly 79 to be formed integrally within a common housing that is releasably connected to mouthpiece subassembly 88. It is also within the scope of the invention for atomizer subassembly 79, mouthpiece subassembly 88, and control subassembly 14 to be formed integrally within a common housing.

Referring to FIG. 3, a vape device system 102 includes vape device 10 and computing device 72 running application 74 thereon. It is understood that computing device 72 includes a processor 94 that runs application 74, and that references herein to computing device 72 include its processor 94. Vape device 100 may also be operated with computing device 72 in the same manner as described below with respect to vape device 10. In some embodiments, vape device 10 can wirelessly communicate with computing device 72 and application 74 via RF communications link 73. In some embodiments, RF communications link 73 can comprise one or more of Bluetooth™ communications protocol, Wi-Fi™ IEEE 802 communications protocol, Zigbee IEEE 802.15.4-based protocol, and any other RF, short-range, and long-range communications protocol as well known to those skilled in the art. Vape device 10 may also communicate with computing device 72 via a wired connection established for example between electrical connector 35 of vape device 10 and a communications connector (not shown) of computing device 72. In some embodiments, application 74 can comprise a visual "dashboard" 75 comprising of visual information and controls that can be operated by a user. In some embodiments, dashboard 75 can comprise user information window 76 for displaying information regarding the operation of vape device 10 in addition to general information. This general information can include general news as well as information on available updates for vape device 10 or the application 74 from the manufacturer or supplier of the same. In some embodiments, the application 74 can access the online source of data described above to update the table of data, which can be done periodically and automatically, or manually by the user prompting the application to update the data, or a combination of both processes. As described above, this online source of data preferably includes operational settings for a plurality of vape devices 10 and substances contained with payload reservoirs 26.

In some embodiments, dashboard 75 can comprise a locate button 78 as a means for the user to determine the location of vape device 10 should the user misplace it. By pressing locate button 78, computing device 72 can send a signal wirelessly to vape device 10 to operate an audible signal from an audio speaker or buzzer or other like device disposed thereon to assist the user in finding vape device 10. In other embodiments, pressing locate button 78 can assist the user to determine his or her geographic location (using geographic location capabilities of computing device 72) and whether cannabis products can be consumed using vape device 10 in that location (e.g., whether there are any governmental regulations, laws, or rules applicable to or enforceable in the geographic area where vape device 10 is located that may subject the user of vape device 10 to criminal or administrative penalties, fines, or enforcement actions). In some embodiments, dashboard 75 can comprise heat swipe button 80 as a means for the user to manually control the heat used to vapourize liquid or oil 64, wherein the signal transmitted by application 74 to vape device 10 to control the heat can be included in the operational setting. In some embodiments, dashboard 75 can comprise lock indicator 82, unlock indicator 84 and swipe button 86 as a means to enable and disable vape device 10 by the user swiping swipe button 86 right or left, respectively.

In some embodiments, application 74 can use the unique payload identifier received from ID tag 28 as a means to determine if the person in possession of vape device 10 and computing device 72 is a permitted user (e.g., application 74 can compare user information associated with the payload identifier with application user information that a user provides to application 74 to determine whether the user of application 74 is permitted to operate vape device 10 and the particular payload reservoir 26). Application 74 can use the general security settings of computing device 72 to enable or disable operation of vape device 10, wherein such security settings can comprise one or more of passwords, fingerprint scan (using fingerprint scanner 85 as shown in FIG. 3), facial recognition scan, retinal scan and any other security settings for computing device 72 as well known to those skilled in the art. The person in possession of computing device 72 and vape device 10 is permitted to open up applications on computing device 72 and, thus, access application 74, then application 74 can send an enable signal to vape device 10, wherein the enable signal can be included in the operational setting, to allow vape device 10 to operate, provided that all other factors or conditions to allow operation of vape device 10 have been met. In some embodiments, when computing device 72 "goes to sleep", is turned off or powers down due to a low battery charge condition, as well known to those skilled in the art, application 74 can send a disable signal to vape device 10, wherein the disable signal can be included in the operational setting, to prevent vape device 10 from operating. In some embodiments, when vape device 10 and computing device 72 are separated by a predetermined physical distance, vape device 10 can turn off or become disabled until it receives an enable signal from computing device 72. In some embodiments, application 74 can require the input of a password by the user, in addition to any password to be entered or other security measure required by computing device 72 to open up, to enable operation of application 74 and, thus, operation of vape device 10. If the user can enter the correct password into application 74, then application 74 can send an enable signal to vape device 10 as part of the operational setting. Otherwise, while application 74 is closed, application 74 can send a disable signal to vape device 10 to disable it.

In some embodiments, the application 74 can utilize sources of secondary data, such as, but not limited to, user information, prescription information, location information, payload information, historical vape device usage information, and historical payload reservoir information. The secondary data may be stored in memory of computing device 72 that is accessible by application 74, in memory of microcontroller 31, and/or in memory remote from vape device 10 and computing device 72 that is accessible via global telecommunications network 92.

User information can include, but is not limited to, various physiological characteristics, such as a user's height, weight, age, gender, medical record and histories, and medical conditions.

In another embodiment, user information can also include demographic information, such as a user's employer, employment history, educational history, criminal history, and the like. Not only can such user information be used for controlling operational settings of the vape device 10, but demographic information can be used to display targeted content, advertisements, and material on the dashboard 75 and/or information window 76.

User information can be retrieved from, for example, third-party health, fitness, and social networking software applications on the computing device 72, such as Facebook®, LinkedIn®, Snapchat®, Twitter®, and/or Fitbit®. In addition, user information can be retrieved by application 74 from third-party databases, such as health information databases, medical records databases, health insurance company databases, crime databases, legal and court databases, and the like.

In yet another embodiment, user information can be entered into the application 74 and/or vape device 10 (via, e.g., user input devices coupled to user input interface circuit 34) by the user.

Prescription information can be retrieved from, for example, pharmacy and dispensary databases, as well as from physicians, pharmacists, and others licensed to write and/or manage prescriptions. The prescription information preferably includes whether a particular user has a valid, unexpired prescription to use the substance within payload reservoir 26.

Location information may include at least one of geographic location of vape device 10, a regulatory code, a government ordinance, and a legal statute. The location information may be determined and used as follows. In some embodiments, application 74 can use the payload identifier of ID tag 28 as a means to determine if the liquid or oil can be consumed in the geographic region, location, country, state, or municipality where the user is located. In these embodiments, application 74 can access global positioning system ("GPS") features that computing device 72 can possess to determine the physical location of computing device 72 and, thus, of its user as well as determining if cannabis oil can be legally consumed by the user in that location using vape device 10. In other embodiments, computing device 72 can use cell tower triangulation techniques or other cell phone location techniques, as well known to those skilled in the art, to determine its geographical location.

The location information regarding the geographical location of computing device 72 can be used by application 74 to send an enable or disable control signal to vape device 10. If cannabis oil can be consumed by the user in that location, then application 74 can send the enable signal to vape device 10 to allow it to operate. If cannabis oil cannot be consumed by the user in that location, because its usage would violate laws or regulations or for any other reason, then application 74 can send the disable signal to vape device 10 to prevent it from operating. In either case, the enable signal or the disable signal can be included with the operational setting. The application 74 preferably compares the geographic location of computing device 72 with a database of location information to determine whether the user may legally use cannabis in that location. The location information may include a simple "yes" or "no" as to whether cannabis may be consumer using vape device 10 for any particular location, and/or more specific information as to whether particular substances may be consumed by the user using vape device 10 for any particular location.

Payload information may include an identification of the particular substance located within a payload reservoir 26 and the original volume of the substance located within payload reservoir 26. Payload information may be used in conjunction with historical payload reservoir information to determine whether a payload reservoir 26 is depleted. Further, payload information may be used in conjunction with user information to determine whether a user is authorized to use the substance located within payload reservoir 26. Payload information may also be used in conjunction with location information to determine whether the particular substance located in payload reservoir 26 may be legally consumed in the jurisdiction where vape device 10 is located.

In another embodiment, application 74 can utilize historical usage information associated with the vape device 10 and/or the payload reservoir 26. Such historical vape device usage information can include, but is not limited to, the number of prior sessions the vape device 10 was accessed, user information related to prior sessions, durations of prior sessions, operational settings of prior sessions, metering and dose information of prior sessions, and the like.

In another embodiment, the historical payload reservoir information can include details related to the payload reservoir 26, such as the original fluid or oil contents, remaining contents, used contents, content usage by session, and the like.

Such historical usage information (historical vape device usage information and historical payload reservoir information) can be used by the application 74 to determine if a payload reservoir 26 has been previously used, and then modify the operational setting accordingly so that tampered with, improperly refilled, or unlawfully refilled payload reservoirs 26 cannot be utilized by vape device 10, or other vape devices operating under the scope of this invention. For example, vape device 10 and/or application 74 may track the usage of payload reservoir 26 and calculate when the original contents of payload reservoir 26 are depleted. When the original contents of payload reservoir 26 are depleted, vape device 10 and/or application 74 may update the historical payload reservoir information to indicate that the payload reservoir 26 cannot be used again. If a user attempts to continue using payload reservoir 26, the operational settings of vape device 10 will be updated by it or by application 74 to disable the vape device 10 and prevent the usage of payload reservoir 26.

In another embodiment, application 74 and/or vape device 10 can utilize acceleration, motion, altitude, and/or velocity sensors to determine if the user is within, for example, a moving vehicle or airplane. Such information can be used by application 74 and/or vape device 10 to restrict access to, or lock, the vape device 10. Sensors 70 such as accelerometers, altimeters, gyroscopes, and velocity sensors may be integrated with the vape device 10 and/or the computing device 72.

In an embodiment, application 74 can utilize any combination of the payload identifier and secondary data, including user information, prescription information, location information, payload information, historical vape device usage information, and historical payload reservoir information, in order to modify, determine, adjust, or otherwise control the operational settings of, and access to, the vape device 10.

Figure 4:
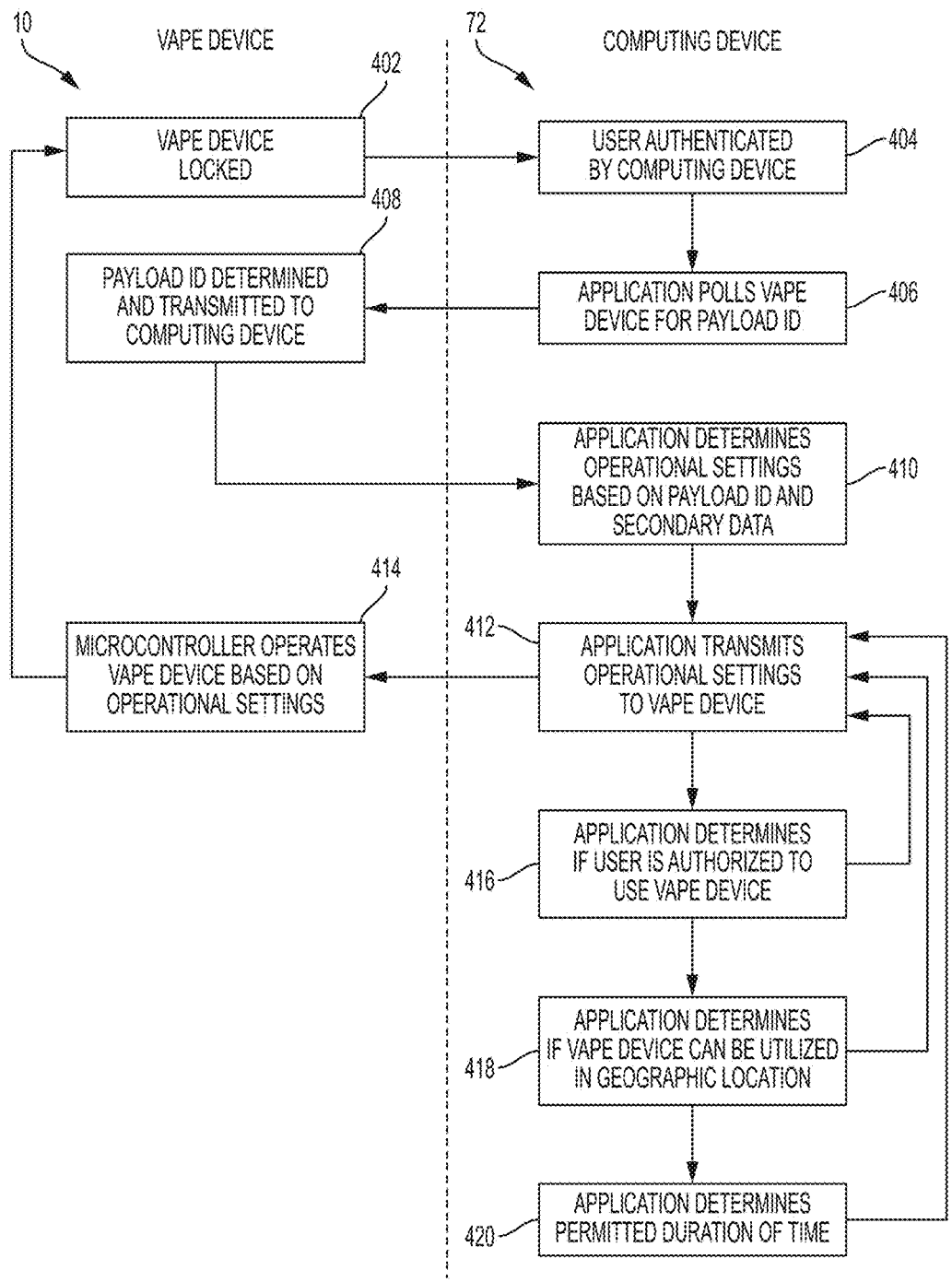
FIG. 4 is a flowchart depicting one embodiment of the steps carried out by the system of FIG. 3.

Referring to FIG. 4, steps in accordance with one exemplary method for operating and controlling vape device 10 or 100 are shown. Although the method is described below in connection with vape device 10, the method may also be used with vape device 100. The method may be carried out by vape device 10 in connection with application 74 running on computing device 72, shown in FIG. 3. The method may start at step 402 with vape device 10 in a default, locked state, meaning, it cannot be operated. When a user gains access to their computing device 72 at step 404, the computing device 72 can confirm the user's identification so as to be able to move to step 406, where the computing device 72 can open the application 74 and then communicate with vape device 10 to poll for the payload identifier of ID tag 28. The application 74 may also be used to authenticate the user prior to transmission of the payload identifier to the computing device 72. At step 408, vape device 10 can, upon being polled by the computing device 72, read ID tag 28 and then transmit the payload identifier to the computing device 72. Specifically, in one embodiment, microcontroller 31 of vape device 10 receives the payload identifier from ID tag 28, transmits the payload identifier to the wireless transceiver (i.e., RF transceiver circuit 36 and antenna(s) 40), and the antenna(s) 40 transmit the payload identifier to computing device 72. In step 410, the application 74 can utilize the payload identifier of ID tag 28, and optionally, secondary data, and then determine the vapourizing or operational settings associated with the payload identifier of ID tag 28, and optionally, as well as in light of the secondary data. In some embodiments, the application 74 proceeds to step 412 and transmits the operational settings to vape device 10. Specifically, in one embodiment, a wireless transceiver of computing device 72 transmits the operational settings to the antenna(s) 40 and RF transceiver circuit 36 of vape device, which transmits the operational settings to the microprocessor of microcontroller 31. In step 414, the microcontroller 31 in the vape device 10 then operates and controls the vape device 10 based on the operational settings.

In other embodiments, the application 74 proceeds to step 416 instead of step 414, whereupon the application 74 can confirm whether the user is authorized to use vape device 10. Application 74 can utilize any combination of secondary data (e.g., user information, prescription information, location information, payload information, historical vape device usage information, and historical payload reservoir information) and the payload identifier in order to determine if the user is authorized to use the vape device 10. For example, application 74 can use secondary data such as prescription information, as well as payload information indicating the contents of the payload reservoir 26, to determine if the prescription associated with the prescription information allows the user to access the payload contents within payload reservoir 26.

In yet another example, application 74 can utilize user information such as gender, age, and weight, as well as historical vape device usage information, to determine an appropriate dosage and/or metering of the vape device 10.

If the user is so authorized, the application 74 can further determine whether payload reservoir 26 (in FIG. 1) or mouthpiece subassembly 88 (in FIG. 2) is genuine and not a counterfeit or, optionally, whether it is stolen or otherwise not authorized for use by the user (e.g., the application 74 may compare the payload identifier to payload information that indicates whether the payload reservoir 26 or mouthpiece subassembly 88 has been reported as tampered with or stolen). If genuine and not stolen, then the application 74 can proceed to step 412 where the operational settings can be transmitted to vape device 10 and the user is subsequently allowed to operate vape device 10 in step 414. If not genuine or stolen, the application 74 can lock vape device 10 to prevent its use.

In other embodiments, the application 74 proceeds from step 416 to step 418, instead of proceeding to step 414. In step 418, the application 74 can determine the geographic location of vape device 10 and whether the liquid or oil in vape device 10 can be consumed in that location by comparing the geographic location to location information obtained by the application 74. If the liquid or oil in vape device 10 can be consumed in the location of vape device 10, the application 74 can proceed to step 412 where the operational settings can be transmitted to vape device 10, and the user is subsequently allowed to operate vape device 10 in step 414. If the liquid or oil in vape device 10 cannot be consumed in the location of vape device 10, the application 74 can lock vape device 10 to prevent its use.

In other embodiments, the application 74 proceeds to step 420 where a permitted duration of time that the vape device 10 can be used is determined. The permitted duration of time can be determined based on any combination of secondary data (e.g., user information, prescription information, location information, payload information, historical vape device usage information, and historical payload reservoir information) and/or the payload identifier. The permitted duration of time can be transmitted to the vape device as an operational setting in step 412. Once the operational settings are received by vape device 10 at step 414, vape device 10 can implement these operational settings to vapourize the liquid or oil contained therein accordingly. In this embodiment, vape device 10 can unlock for use by the user in accordance with the received operational settings. In addition, the vape device 10 can be locked in step 402 after the permitted duration of time or usage has expired.

In addition, after the vape device 10 is operated in step 414, vape device 10, either via the microcontroller 31 and/or the application 74, can be locked in step 402 after use, after a predetermined duration, after being deactivated by the user, after the payload reservoir 26 is deemed or calculated to be empty or used, after a new user has been detected, and/or for any other reason that vape device 10 may be locked as described herein.

In one embodiment, the method shown in FIG. 4 may be carried out by vape device 10 running application 74, or an application similar thereto, on the microprocessor of microcontroller 31 without use of computing device 72. In such an embodiment, step 402 remains the same as described above. Step 404 may be modified so that user information is inputted into vape device 10 to determine whether the user is an approved user of vape device 10 and the contents of payload reservoir 26. Steps 406 and 408 may be omitted, or optionally, step 408 may comprise the microprocessor of microcontroller 31 receiving the payload identifier from ID tag 28. In step 410, operational settings are determined based on the payload identifier and/or the secondary data as described above but they are determined by the microprocessor of microcontroller 31 of vape device 10. Step 412 is omitted as the operational settings are already contained on vape device 10. Step 414 proceeds as described above. Optional steps 416, 418, and 420 may proceed as described above but with an application running on the microprocessor of microcontroller 31 carrying out the steps.

In yet another embodiment, the computing device 72 is integrated within, or physically coupled to, the vape device 10. In this embodiment, the payload identifier can be transmitted to the computing device 72 via an electrical connection between the payload reservoir 26 and the integral computing device 72. Similarly, the computing device 72 can transmit the operational settings via the electrical connection to the microcontroller 31. In yet another embodiment, the integral computing device 72 can include a wireless transceiver, or an optical transceiver, and can operate as in the remote computing device embodiments described herein.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A vape device system comprising:
a vape device comprising:
an atomizer comprising an inlet and an outlet;
a mouthpiece coupled to the outlet;
an activation mechanism coupled to the atomizer;
a payload reservoir coupled to the inlet, wherein the payload reservoir is identified by a unique payload identifier that is unique to the payload reservoir, and wherein the payload reservoir is configured to hold a substance for vapourization;
a first processor that is configured to receive the unique payload identifier from the payload reservoir; and
a wireless transceiver that is configured to receive the unique payload identifier from the first processor and transmit the unique payload identifier; and
a computing device remote from the vape device comprising a second processor that is configured to:
receive the unique payload identifier from the wireless transceiver;
determine secondary data comprising payload information and user information based on the unique payload identifier, wherein the payload information and the user information are stored in a memory remote from the vape device and the computing device, wherein the payload information comprises an identification of the particular substance located within the payload reservoir, and wherein the user information is associated with a user and with the unique payload identifier;
authenticate the user via a software application on the computing device;
compare the user information associated with the unique payload identifier with application user information that the user provides to the software application to determine whether the user is permitted to use the payload reservoir; and
determine an operational setting for the vape device based on the payload information, and
wherein the wireless transceiver is further configured to receive the operational setting from the second processor and transmit the operational setting to the first processor of the vape device.

2. The vape device system of claim 1, wherein the computing device is configured to determine the operational setting based on additional secondary data comprising at least one of user information, prescription information, and location information.

3. The vape device system of claim 1, wherein the operational setting includes at least one of a duty cycle setting, a temperature setting, an operational time duration, a dosage setting, and a security setting.

4. The vape device system of claim 1, wherein the first processor is configured to control operation of the atomizer based on the operational setting.

5. The vape device system of claim 1, wherein the first processor is coupled to at least one of the atomizer, the mouthpiece, and the payload reservoir.

6. The vape device system of claim 1, wherein the atomizer comprises a heating element, and wherein the activation mechanism is configured to cause electrical current from a power source to flow through the heating element.

7. A method of determining an operational setting of a vape device comprising a payload reservoir that is identified by a unique payload identifier that is unique to the payload reservoir, the method comprising:
receiving user information associated with a user;
associating the user information with the unique payload identifier;
authenticating the user via a software application on a computing device;

transmitting the unique payload identifier from a wireless transceiver of the vape device to the computing device;

determining secondary data comprising payload information and the user information with the computing device based on the unique payload identifier, wherein the payload information and the user information are stored in a memory remote from the vape device and the computing device, and wherein the payload information comprises an identification of a particular substance located within the payload reservoir;

comparing the user information associated with the unique payload identifier with application user information that the user provides to the software application to determine whether the user is permitted to use the payload reservoir;

determining the operational setting with the computing device based at least in part on the payload information;

transmitting the operational setting from the computing device to the vape device; and controlling the vape device based on the operational setting.

8. The method of claim 7, wherein the operational setting is determined based on additional secondary data comprising historical vape device usage information or historical payload reservoir information, and the operational setting includes at least one of a duty cycle setting, a temperature setting, an operational time duration, and a dosage setting.

9. The method of claim 7, wherein the operational setting is determined based on additional secondary data comprising prescription information, and the operational setting includes at least one of a duty cycle setting, a temperature setting, an operational time duration, and a dosage setting.

10. The method of claim 7, wherein the operational setting is determined based on additional secondary data comprising location information, and the operational setting is a security setting of the vape device.

11. The method of claim 10, wherein the location information includes at least one of geographic location, a regulatory code, a government ordinance, and a legal statute.

12. The method of claim 7, wherein the operational setting is determined based on additional secondary data comprising user information, and the operational setting is a security setting of the vape device.

13. The method of claim 7, wherein the operational setting is determined based on additional secondary data comprising user information, and the operational setting includes at least one of a duty cycle setting, a temperature setting, an operational time duration, and a dosage setting.

14. The method of claim 13, wherein the user information includes at least one of a user weight, user gender, user height, user age, medical record, and medical condition.

15. The method of claim 7, wherein the operational setting is determined based on additional secondary data comprising at least one of user information, prescription information, location information, historical vape device usage information, and historical payload reservoir information, and further comprising unlocking or locking the vape device for a specified time based on the operational setting.

16. The method of claim 7, further comprising unlocking or locking the vape device based on a detected motion, acceleration, altitude, or velocity of the vape device or the computing device.

17. The method of claim 7, wherein the operational setting is determined based on additional secondary data comprising user information, and wherein the operational setting is based on the user information.

18. The method of claim 17, wherein the user information includes at least one of a user weight, user gender, user height, user age, medical record, and medical condition.

19. The method of claim 17, wherein the user information includes a pharmaceutical prescription.

20. The method of claim 17, further comprising requesting the unique payload identifier from the vape device by the software application.

21. The method of claim 17, wherein the operational setting includes at least one of a duty cycle setting, a temperature setting, an operational time duration, and a dosage setting.

* * * * *